Jan. 27. 1925.

H. D. DARLINGTON

CASTER

Original Filed April 4, 1923

1,524,424

WITNESSES

INVENTOR
H. D. Darlington,
BY
ATTORNEYS

Patented Jan. 27, 1925.

1,524,424

UNITED STATES PATENT OFFICE.

HOWARD D. DARLINGTON, OF DAYTON, OHIO.

CASTER.

Original application filed April 4, 1923, Serial No. 629,887. Divided and this application filed January 9, 1924. Serial No. 685,238.

*To all whom it may concern:*

Be it known that I, HOWARD D. DARLINGTON, a citizen of the United States of America, residing at Dayton, in the county of Montgomery, State of Ohio, have invented certain new and useful Improvements in Casters, of which the following is a specification.

My invention relates to improvements in casters, and it consists in the combinations, constructions, and arrangements herein described and claimed.

More particularly, the present invention is a division of my prior application for Letters Patent of the United States for household accessory, Serial No. 629,887, filed Apr. 4, 1923, in which I disclose a caster construction embodying the present invention.

An object of the present invention is to provide a caster which is strong and durable in construction and is adapted to sustain a relatively heavy load without any binding action on the relatively movable parts of the caster, the caster wheel having relatively free and easy bodily movement about a vertical axis and also being supported for rotational movement about a horizontal axis.

A further object of the invention is to provide a caster having means comprised in the construction thereof for distributing the stresses occasioned by the imposition of a weight thereon so that the article supported upon the caster may move laterally upon a supporting surface in a uniform manner in response to a relatively slight or varying pressure.

Other objects and advantages will be apparent from the following description, considered in conjunction with the accompanying drawings, in which.

Figure 1:
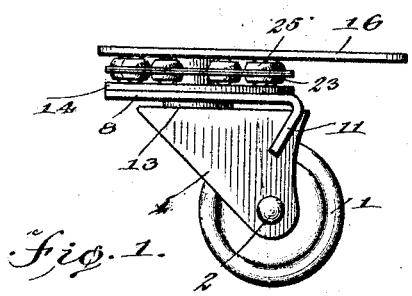
Figure 1 is a side elevation of a caster embodying the invention.
Figure 2:
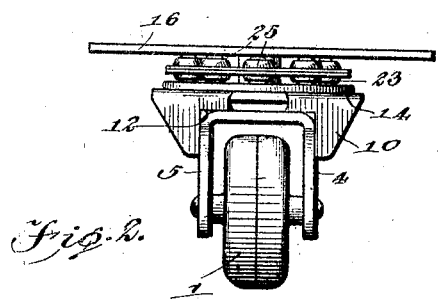
Figure 2 is a front elevation of the caster.
Figure 3:
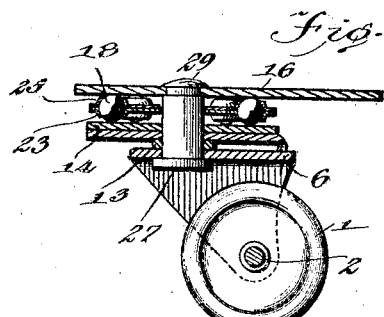
Figure 3 is a vertical section through the caster.
Figure 4:
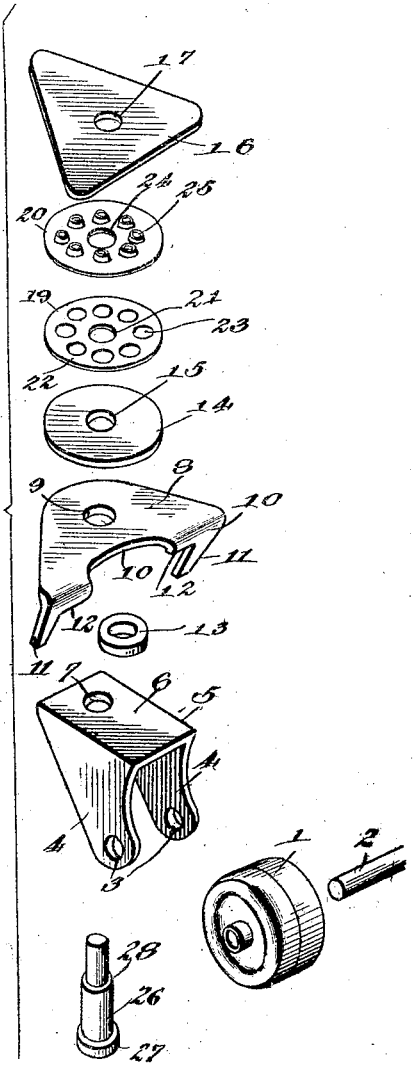
Figure 4 is a perspective group view showing the respective elements of the caster separated from one another.

Referring now to the drawings, and particularly to Figures 1 to 4, inclusive, a caster embodying the invention may comprise a caster wheel 1 which is adapted to be mounted for rotation upon a horizontal axle 2. The latter has the end portions thereof secure in aligned openings 3 in the lower end portions of the depending vertical arms 4 of a yoke 5. The yoke 5 is substantially U-shaped in cross sectional contour and includes a horizontal flat web or body portion 6. The depending vertical arms 4 decrease in width toward their lower ends and are turned slightly in the direction of length of the web 6 so that the openings 3 lie in a vertical plane which intersects the web 6 adjacent to one of its ends. The web 6 is provided adjacent to its other end with an opening 7 which is located midway between the side edges thereof.

A thrust equalizing plate comprises a horizontal portion 8 formed with an opening 9 adapted to register with the opening 7. The horizontal portion 8 is integral with a vertical portion 10 which depends from one edge thereof. The vertical portion 10 is cut away as indicated at 10 to provide at the ends thereof depending fingers 11 which are adapted to straddle the arms of the yoke 5 and to engage with the outer faces of such arms to hold the thrust equalizing plate against rotational movement relatively to the yoke. The cut-away portion 10 of the thrust equalizing plate also provides bearing portions 12 which rest upon the upper face of the web of the yoke and co-operate with a spacing washer 13 to hold the horizontal portion 8 of the thrust equalizing plate in spaced parallel relation to the web of the yoke 5. The spacing washer 13, of course, is provided with a central opening adapted to register with the openings 7 and 9 and may be dispensed with if desired, in which event the bearing shoulders 12 may also be omitted so that the horizontal portion 8 will rest flatwise upon the web of the yoke 5.

When the thrust equalizing plate is supported upon the yoke 5 in the manner described, the depending vertical portion 10 of such thrust equalizing plate will lie in a vertical plane which is substantially coincident with the vertical plane which intersects the axis of rotation of the wheel 1.

The circular plate 14 is superimposed upon the horizontal portion 8 of the thrust equalizing plate and has a central opening 15 adapted to register with the opening 9. The plate 14 has parallel upper and lower faces, the former of which constitutes the lower wall of a ball race. The upper wall of the ball race is the horizontal lower face of a substantially triangular plate 16 which has a central opening 17 adapted to register with the central opening 15. Ball members 18 are retained in rolling contact with the adjacent faces of the plates 14 and 16 by a pair of co-operative ball-retaining plates 19 and 20, respectively. The plate 19 has a central opening 21 adapted to register with the opening 15 and is provided with a circular series of openings 22 which are punched therefrom in such manner as to provide depending lugs 23. The circular series of openings 22 is concentric with the opening 21 and may comprise any desired number of openings 22 within the limits set by the area of the plate 19. The plate 20 has a central opening 24 adapted to register with the opening 21 and is provided with a circular series of openings from which are upstanding lugs 25, the series of openings in the plate 20 being concentric with the opening 24 and the openings of such series corresponding in area and relative arrangement with the openings 22 of the plate 19 so that each of the ball members 18 may be partially received in one of the openings 22 and partially received in the corresponding opening of the plate 20, such ball member protruding below the plate 19 and above the plate 20 and being in rolling contact with the plates 14 and 16. The lugs 23 are bent slightly inward toward their lower ends and the lugs 25 are similarly bent toward their upper ends so that the ball members are retained against displacement from position between the plates 19 and 20 when the extent of bodily movement of the plate 16 relatively to the plate 14 is limited by means which will now be described. Such means comprises a vertical spindle 26 in the form of a pin having a head 27 at the lower end thereof and being adapted to be inserted through the opening 7, the central opening of the washer 13, the opening 9 of the thrust equalizing plate, the opening 15 of the plate 14, the openings 21 and 24 of the ball holding washers and the opening 17 of the plate 16 in turn, the plate 16 resting upon a shoulder 28 with which the spindle 26 is provided adjacent to its upper end and the extending upper end portion of the spindle then being upset, as indicated at 29, so that the head 27 of the spindle will be held in contiguous relation to the lower face of the web of the yoke 5.

The plate 16 may be triangular in configuration, as shown, and may constitute the attaching plate of the caster and be adapted to be secured to the article which is to be supported on the caster in any suitable known manner, as by spot welding.

From the foregoing description of the various parts of the device, the operation thereof may be readily understood. The radial distance from the center of the central opening in each of the ball holding plates 20 to the central point of one of the ball-receiving openings in such plate is approximately equal to the distance from the center of the opening 7 to the vertical plane intersecting the axis of rotation of the wheel 1. In consequence, any stress transmitted along either the arms 4 of the yoke 5 or the vertical spindle 26 will be distributed by the thrust equalizing plate 8 to all the balls 18 so that there will be no binding on the relatively moving parts of the caster when relatively heavy or varying loads are superimposed on the caster. The wheel carrying yoke will be effectively held against tilting and the yoke 5 and the thrust equalizing plate will be permitted to move as a unit freely about the axis of the spindle 26 and the caster wheel 1 will be permitted to rotate freely about the axis of the axle 2. It, therefore, will be manifest that the caster which my invention provides is reliable, strong and durable, and not likely to get out of order in service.

Figures 5, 6:
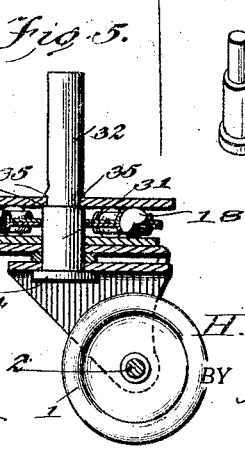
Figure 5 is a view similar to Figure 3, showing a modified form of caster embodying the present invention.
Figure 6 is a perspective view showing an attaching plate which may be substituted for a somewhat similar arrangement of the form of the caster shown in Figs. 1 to 4, inclusive.

If desired, the triangular plate 16 of the form of caster hereinbefore described may be replaced by a circular plate 30, as shown in Figure 5, and the spindle 26 may be replaced by a spindle 31 having a relatively long portion 32 extending above the shoulder 33 upon which the plate 30 rests, the spindle 31 being provided with a head 34 at its lower end. The plate 30 may be held against upward movement along the extension 32 from position upon the shoulder 33 in any suitable known manner, as by punching retaining lugs 35 therefrom. The upstanding upper end portion 32 of the spindle is adapted to enter a socket in the article which is to be supported on the caster. The form of the device exhibited in Figure 5 is otherwise identical in construction with the form of the device exhibited in Figures 1 to 4, inclusive, and the same reference characters, therefore, have been used to designate like parts of the two forms of the device. Also, if desired, the triangular plate 16 may be replaced by a plate 40 which has a central opening 41 adapted to receive the upper end portion of the spindle 26, the plate 40 also having a plurality of openings 42 preferably located adjacent to the marginal edge thereof and being adapted to receive screws (not shown) or like devices for fastening a plate 40 to the article which is to be supported upon the caster. The plate 40 may be rectangular in configuration as shown, or may have any other desired geometrical configuration.

Obviously, my invention is susceptible of embodiment in forms other than those exhibited in the accompanying drawings, and I, therefore, consider as my own, all modifications and adaptations thereof which fairly fall within the scope of the appended claims.

I claim:—

1. A caster comprising a substantially U-shaped frame, a wheel rotatably supported between the arms of the U-shaped frame, said frame having an opening through its web adjacent to one end of the latter, a vertical pivot pin journaled in the opening and extending upwardly above the plane of the web, and a thrust equalizing plate having an opening through which the extending portion of the vertical pivot pin extends, said thrust equalizing plate bearing on the web at a plurality of points and having finger portions depending from opposite side edges thereof in engagement with the frame at opposite sides of the latter.

2. A caster comprising a substantially U-shaped frame, a wheel rotatably supported between the arms of the U-shaped frame, said frame having an opening through its web adjacent to one end of the latter, a vertical pivot pin journaled in the opening and extending upwardly above the plane of the web, a thrust equalizing plate having an opening through which the extending portion of the vertical pivot pin extends, said thrust equalizing plate bearing on the web at a plurality of points and having finger portions depending from opposite side edges thereof in engagement with the frame at opposite sides of the latter, and an attaching plate supported anti-frictionally upon the thrust equalizing plate and having an opening through which the vertical pivot pin extends.

3. A caster comprising a substantially U-shaped frame, a wheel rotatably supported between the arms of the U-shaped frame, said frame having an opening through its web adjacent to one end of the latter, a vertical pivot pin journaled in the opening and extending upwardly above the plane of the web, and a thrust equalizing plate having an opening through which the vertical pivot pin extends and being supported at a plurality of spaced apart points on the web of the frame in such manner as to be sustained on the web in spaced parallel relation to the latter, said thrust equalizing plate and said frame having co-engaging portions holding the former against rotation about the axis of the vertical pivot pin independently of the frame.

4. A caster comprising a substantially U-shaped yoke having a pair of depending vertical arms, a wheel rotatably supported between the arms of the yoke in such position that a plane intersecting the wheel at its axis and extending at right angles to the web of the yoke intersects the latter between the transverse median line of the web of the yoke and one end of the latter, said web being provided with an opening located between its transverse median line and the other end thereof, a vertical spindle journaled in the opening of the web of the yoke and extending above the latter, a spacing washer encircling said spindle and resting upon the web of the yoke, a thrust equalizing plate having an opening through which the vertical pivot pin extends, and having bearing portions remote from the opening resting upon the web of the yoke and co-operating with said spacing washer to hold the body of the thrust equalizing plate in spaced parallel relation to the web of the yoke, said bearing portions having a pair of depending fingers straddling said yoke and engaging with the arms of the latter, a ball race member superimposed upon said thrust equalizing plate and loosely encircling said spindle, a pair of ball retaining plates superimposed upon said ball race member and loosely mounted on said spindle, said ball holding plates being formed to hold a circular series of freely rotatable balls on the ball race member in concentric relation to said spindle, and an upper ball race member encircling said spindle and held against axial movement along the latter.

HOWARD D. DARLINGTON.